United States Patent
Volmut

(10) Patent No.: US 9,767,332 B1
(45) Date of Patent: Sep. 19, 2017

(54) SYSTEM AND METHOD FOR MARKING, TRACKING, AND LOCATING STAINS ON A FABRIC ITEM FOR APPLICATION OF A STAIN TREATMENT PRIOR TO LAUNDERING

(71) Applicant: Joan Volmut, Racine, WI (US)

(72) Inventor: Joan Volmut, Racine, WI (US)

( * ) Notice: Subject to any disclaimer, the term of this patent is extended or adjusted under 35 U.S.C. 154(b) by 0 days.

(21) Appl. No.: 15/239,426

(22) Filed: Aug. 17, 2016

Related U.S. Application Data

(60) Provisional application No. 62/206,376, filed on Aug. 18, 2015.

(51) Int. Cl.
| | | |
|---|---|---|
| *G06K 7/10* | (2006.01) | |
| *G06K 19/07* | (2006.01) | |
| *A41F 1/00* | (2006.01) | |
| *D06F 93/00* | (2006.01) | |

(52) U.S. Cl.
CPC .......... *G06K 7/10297* (2013.01); *A41F 1/002* (2013.01); *D06F 93/005* (2013.01); *G06K 19/0723* (2013.01); *G06K 2207/1012* (2013.01)

(58) Field of Classification Search
None
See application file for complete search history.

(56) References Cited

U.S. PATENT DOCUMENTS

2016/0342936 A1\* 11/2016 Milum ................. H04B 5/0062

\* cited by examiner

*Primary Examiner* — Kristy A Haupt
(74) *Attorney, Agent, or Firm* — Brie A. Crawford

(57) ABSTRACT

A system and method for marking, tracking, and locating stains on a fabric item for application of a stain treatment prior to laundering is disclosed. The system and method uses an RFID tag to mark the stain or stains on a fabric item and uses a transponder to locate the RFID tag and the stained fabric item. The user is then able to precisely locate both the stained fabric item and the precise location of the stain or stains on the fabric item for a chemical pretreatment prior to laundering. Once the stained fabric item is located, the RFID tag is removed and once all RFID tags are removed, the transponder is placed in a standby or power saving mode.

4 Claims, 3 Drawing Sheets

SYSTEM AND METHOD FOR MARKING, TRACKING, AND LOCATING STAINS ON A FABRIC ITEM FOR APPLICATION OF A STAIN TREATMENT PRIOR TO LAUNDERING

CROSS REFERENCE TO RELATED APPLICATION AND INCORPORATION BY REFERENCE

This application claims priority to the previously filed United States of America Provisional Patent Application titled SYSTEM AND METHOD FOR MARKING, TRACKING AND LOCATING STAINS ON A FABRIC ITEM FOR APPLICATION OF A STAIN TREATMENT PRIOR TO LAUNDERING, with an application filing date of Aug. 18, 2015, in the United States Patent and Trademark Office, Application No. 62/206,376, said application by the same inventive entity, with the entirety of said application being incorporated herein by reference to provide continuity of disclosure.

FIELD OF THE INVENTION

This invention relates generally to a system and method for marking, tracking, and locating stains on a fabric item for application of a stain treatment prior to laundering and more particularly, to a system and method for marking, tracking, and locating stains on a fabric item for application of a stain treatment prior to laundering that uses RFID technology to mark and then, track and locate stains on a fabric item so that the stains can be treated with a chemical pretreatment prior to laundering.

BACKGROUND OF THE INVENTION

Fabric items and fabric item stains have coexisted for as long as fabric items have been made. Fabric items can, for example, be wearable apparel items and non-wearables. Further, food stains, grass stains, and stains of all sorts are common to both wearable apparel items and non-wearables. One reality of treating and removing fabric stains is that such stains must be treated with some sort of chemical pretreatment prior to laundering. In most instances, however, it is not practical to treat and launder the stained fabric item immediately upon the stain occurring. For this reason, as is true in most households, stained fabric items tend to be accumulated with other fabric items for washing at a later time. However, by the time the stained and non-stained items are sorted for washing, it may be hard to locate each stained item and the exact area that is stained. Thus, stained items may be laundered without a chemical pretreatment due to error and the fabric item may be ruined. A system and method for marking, tracking, and locating stained fabric items for application of a stain treatment prior to laundering is a useful invention.

A fabric item may be stained and then, placed in a laundry hamper for an extended period of time before laundering. By the time the laundry is sorted for laundering, the stained fabric item may be forgotten and placed in the laundering equipment as if it were not stained. The proper chemical pretreatment may not be applied to the stained fabric item and as a result, it may be ruined after laundering. A system and method that can mark, and then locate and track stained items in a pile of stained and non-stained items is a useful invention.

Also, if there is an extended period of time between the fabric item being stained and laundering, a user may remember that a particular fabric item is stained, but may not remember precisely where the stain is. If the stain cannot be located, it cannot be pretreated and the fabric item can be ruined. If there are multiple stains, then the user may chemically pretreat one stain, but may miss the others and again, the fabric item may be ruined. A system and method that can mark, and then locate and track not only the fabric item that is stained, but the precise location of the stain or stains is a useful invention.

SUMMARY OF THE INVENTION

An objective of the present invention is the provision of a system and method for marking, tracking, and locating stains on a fabric item for application of a stain treatment prior to laundering that is used to locate stains on washable fabric items such that a prewash stain treatment can be applied to the stain prior to laundering of the stained fabric item.

Another objective of the present invention is the provision of a system and method for marking, tracking, and locating stains on a fabric item for application of a stain treatment prior to laundering that can effectively and electronically sort stained fabric items from unstained fabric items when they are intermingled with general laundry.

Moreover, an objective of the present invention is the provision of a system and method for marking, tracking, and locating stains on a fabric item for application of a stain treatment prior to laundering that allows a user to precisely locate and treat the stained area prior to laundering.

Also, an objective of the present invention is the provision of a system and method for marking, tracking, and locating stains on a fabric item for application of a stain treatment prior to laundering that uses a plurality of RFID tags that can be attached to a stained fabric item and specifically, to that area of the stained fabric item where the stain is located to allow the user, armed with a transponder device, to locate such stains precisely and accurately.

A still further objective of the present invention is the provision of a system and method for marking, tracking, and locating stains on a fabric item for application of a stain treatment prior to laundering that upon activation of a transponder device, RFID tags can be activated to emit a sound, a light, or other indicator which can then allow the user to locate the stained area of the fabric item and treat the stained area with a prewash stain treatment prior to laundering.

These and other objectives of the invention (which other objectives become clear by consideration of the specification, claims, and drawings as a whole) are met by providing a system and method for marking, tracking, and locating stains on a fabric item for application of a stain treatment prior to laundering that uses RFID technology to mark and then, track and locate stains on a fabric item so that the stains can be treated with a chemical pretreatment prior to laundering.

BRIEF DESCRIPTION OF THE DRAWINGS

Throughout the figures of the drawings, where the same part appears in one or more than one figure of the drawings, the same number is applied thereto.

DETAILED DESCRIPTION OF THE PREFERRED EMBODIMENTS

Figure 1:
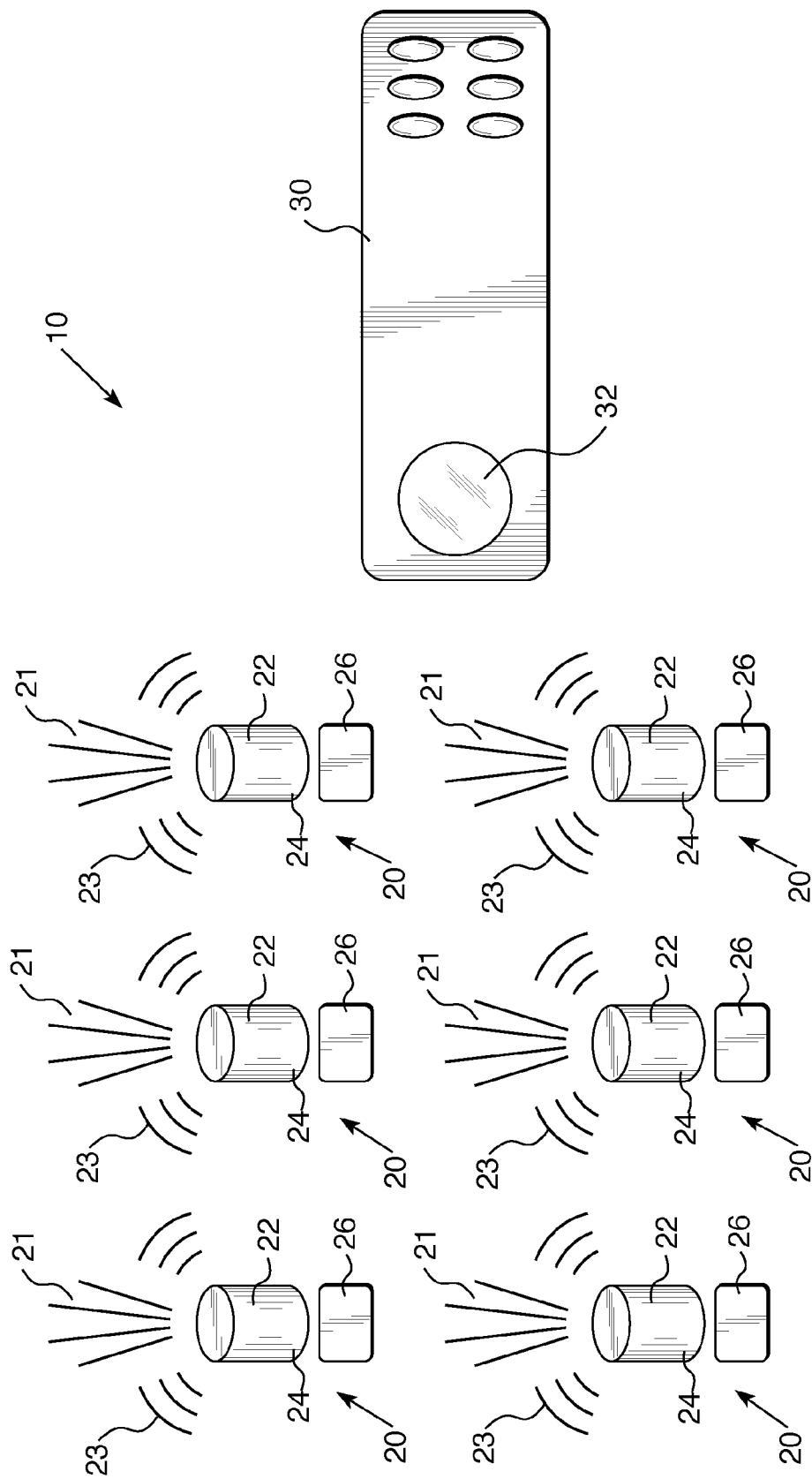
FIG. 1 depicts a top plan view of the elements of a preferred embodiment of system and method 10 which include RFID tags 20 and transponder 30.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the invention in any manner. The words attach, connect, couple, and similar terms with their inflectional morphemes do not necessarily denote direct or intermediate connections, but may also include connections through mediate elements or devices.

Radio frequency identification technology is well known. It will be referred to as RFID technology or RFID throughout this application. U.S. Pat. No. 7,199,719 issued to Steinberg, titled "RFID Tag Reader with Tag Location Indicated by Visible Light Beam", discloses RFID technology that uses light emissions to allow a user to locate the tags. U.S. Pat. No. 6,674,364 issued to Holbrook et al., titled "Object Finder", discloses RFID technology that uses sound and light emissions to locate the tags. U.S. Pat. No. 8,222,996 issued to Smith et al., titled "Radio Frequency Identification Tags Adapted for Localization and State Indication", discloses RFID technology that uses LED light emissions to locate the tags. All parts of these patents necessary to enable this disclosure are herein incorporated by reference.

There are a number of commercially available transponders and RFID tags with a variety of features. Any of these transponder and tags sets can be utilized as part of the system and method of this invention. The transponder can be a commercially available transponder or it can be a cell phone with the appropriate hardware, software, and mobile applications to allow the cell phone to communicate with the RFID tags.

Figure 2:
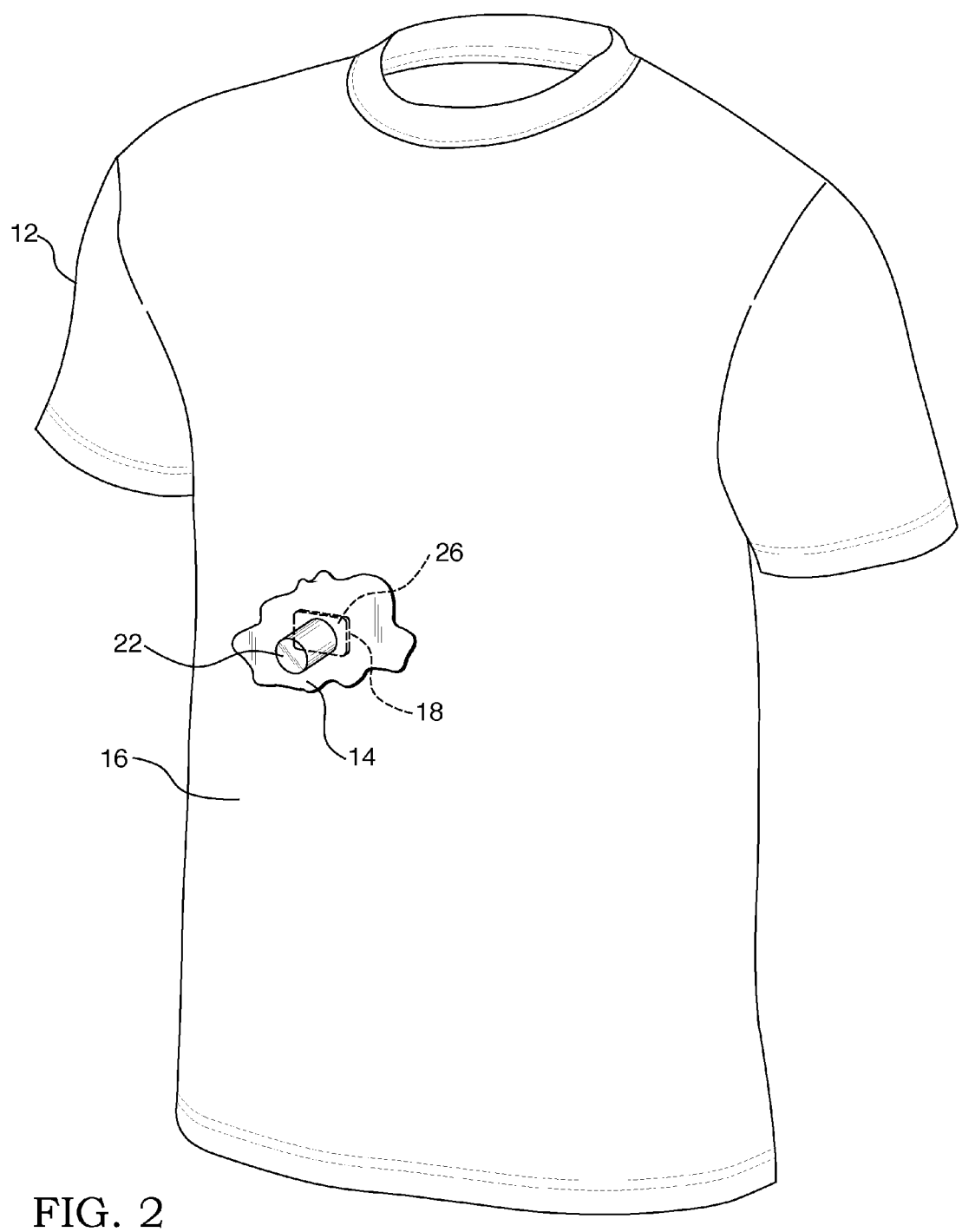
FIG. 2 depicts a left, front perspective view of fabric item 12 with an RFID tag 20 marking stain 14.

Now adding FIG. 1 and FIG. 2 to the consideration, the elements and function of system and method 10 can be clearly seen. System and method 10 comprise one or a plurality of electronic RFID tags 20 that can be applied, one at a time, to stained fabric items 12. Transponder 30 communicates with RFID tags 20 to locate stained fabric items 12.

Each RFID tag 20 comprises tag housing 22 within which is housed electronic circuitry (not shown). Although six such RFID tags 20 are shown in FIG. 1, the present invention is not limited to that number of RFID tags 20 as any number of RFID tags 20 may be used, depending on the number of stained fabric items 12 or the number of stains 14 on each stained fabric item 12 that require chemical pretreatment. All such numbers of RFID tags 20 are encompassed by this disclosure.

One side 24 of tag housing 22 is a metallic surface that is ferrous in nature, thereby making RFID tag 20 attachable to stained fabric item 12 via magnet 26. Magnet 26 is the preferred embodiment for attaching RFID tags 20 to stained fabric item 12 as magnet 26 will not damage or leave holes in fabric item 12. However, there are other suitable attachment means to secure RFID tag 20 to stained fabric item 12 such as clips, pins, and any other suitable attachment mechanism and all are encompassed by this disclosure.

As seen in the cited patents RFID tag 20 and transponder 30, there are a variety of features that exist in the market. Some desired features of any RFID tag 20 that is used with system and method 10 include an on-board power supply, such as a battery, and RFID capability. Each RFID tag 20 further comprises signal emission functionality, which can be either via a visual signal 21, such as light emission, or via an audio signal 23, such as sound emission. Other signal emissions can be used as well, but those stated here are the preferred embodiments.

If there are multiple RFID tags 20 in close proximity, transponder 30 may activate all tags 20 and all tags 20 may emit visual signal 21 or audio signal 23. Or, the internal circuitry of RFID tags 20 and transponder 30 may allow transponder 30 to activate only one specific RFID tag 20 in the vicinity and cause only specific RFID tag 20 to emit visual signal 21 or audio signal 23 (U.S. Pat. No. 8,222,996).

It is also desirable for RFID tag 20 to have a power saving capability such that the electronics for RFID tag 20 can be placed in a sleep, standby, or power saving mode during which minimal power is consumed by RFID tag 20 to prolong battery life when not in use.

RFID tag 20 is activated into power mode by transponder 30. Transponder 30 has on/off button 32 which is used to activate the transmission of a wireless signal in the on position and stop the transmission in the off position. Upon activation of transponder 30 into power mode, the signal from transponder 30 will activate each RFID tag 20. An activated RFID tag 20 will emit a visual 21 or sound 23 signal that allows the user to locate each RFID tag 20 on each stained fabric item 12, remove RFID tag 20 from each stained fabric item 12, chemically pretreat stain 14, and place stained fabric item 12 into a washing machine or other laundering equipment. Once RFID tag 20 is removed, transponder 30 can be used to place each RFID tag 20 back into a sleep or standby mode for future use. Then, on/off button 32 is utilized to place transponder 30 into standby or sleep mode.

Figure 3:
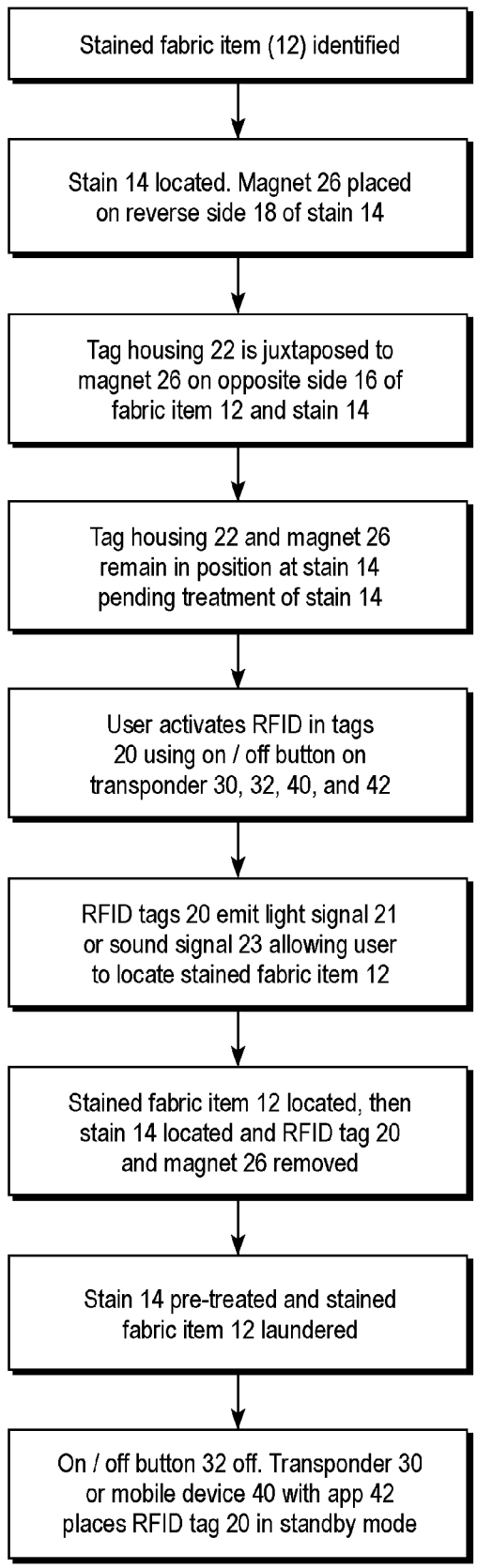
FIG. 3 depicts a flow chart of system and method 10 of this invention.

Now adding FIG. 3 to the consideration, the function and process of system and method 10 can be clearly seen. System and method 10 begins when a user has stained fabric item 12. The user locates stain 14 on stained fabric item 12.

Then, magnet 26 is placed on reverse side 18 of fabric item 12 at stain 14. Tag housing 22 is juxtaposed, but to the opposing side 16 of fabric item 12 at stain 14. By means of magnetic attraction, tag housing 22 and magnet 26 remain in position at stain 14 pending further treatment of stain 14 by the user. If stained fabric item 12 has more than one stain 14, a separate RFID tag 20 is applied to each stain 14 in the same fashion as described.

Generally, once RFID tags 20 are applied, stained fabric items 12 are piled in a laundry basket, hamper, or on the floor with non-stained fabric items. However, system and method 10 only requires the user to be in the proximity of stained fabric items 12 with attached RFID tags 20 regardless of location, proximity to non-stained fabric items, or method of storage.

When the user desires to locate stained fabric items 12 with attached RFID tags 20, the user approaches the location of the stained fabric items 12. The user activates transponder 30 through on/off button 32. Transponder 30 activates RFID tags 20 and RFID tags 20 emit visual signal 21 or audio signal 23. The user locates stained fabric items 12 through visual signal 21 or audio signal 23. The user retrieves stained fabric item 12 from the pile and removes RFID tags 20. Then, the user pretreats stain 14 on stained fabric item 12 before laundering.

Once all RFID tags 20 have been retrieved from stained fabric items 12, the user deactivates transponder 30 to standby mode through on/off button 32.

In view of the foregoing, it will be appreciated that there is provided, via this invention, a system and method that is used to mark, track, and locate stains in washable fabric items such that a prewash stain treatment can be applied to the stain prior to laundering of the stained fabric item. Using this system and method as described, stained fabric items can be effectively and electronically sorted from unstained fabric items. The system and method of the present invention allows a user to precisely locate and treat the stained area prior to laundering. The system and method uses a plurality of RFID tags that can be attached to a stained fabric item and, specifically, to that area of the stained fabric item where the stain is located. Using an RFID tag in such a way allows the user, armed with a transponder device, to locate the stains and treat them prior to laundering. Upon activation of the transponder device, the RFID tags can emit a sound, a light, or other indicator which can then allow the user to find the stained fabric item, locate the stained area of the fabric item, and treat the stained area with a prewash stain treatment prior to laundering.

This application—taken as a whole with the abstract, specification, claims, and drawings—provides sufficient information for a person having ordinary skill in the art to practice the invention disclosed and claimed herein.

Any measures necessary to practice this invention are well within the skill of a person having ordinary skill in this art after that person has made a careful study of this disclosure.

Because of this disclosure and solely because of this disclosure, modification of this system and method can become clear to a person having ordinary skill in this particular art. Such modifications are clearly covered by this disclosure.

What is claimed and sought to be protected by Letters Patent is:

1. A method for marking, tracking, and locating stains on a fabric item for application of a stain treatment prior to laundering comprising the steps of:
 a) locating at least one stain on at least one stained fabric item;
 b) marking each of the at least one stains with at least one RFID tag thereby creating at least one tagged stained fabric item;
 c) tracking the at least one RFID tag through an RFID transponder;
 d) locating the at least one tagged stained fabric item through an emission from the at least one RFID tag;
 e) creating the at least one tagged stained fabric item by magnetically attaching the at least one RFID tag to the at least one stained fabric item through the interaction of at least one RFID tag housing and a magnet wherein, the at least one RFID tag housing has at least one side that is a ferrous metallic surface;
 f) activating the RFID transponder through an on/off button wherein, the RFID transponder is activated from standby mode to power mode through the on/off button;
 g) the RFID transponder activating the at least one RFID tag wherein, the at least one RFID tag emits a visual or audio signal once activated;
 h) locating the at least one tagged stained fabric item through the visual or audio signal;
 i) removing the at least one RFID tag from the at least one stained fabric item by releasing the magnetic attraction wherein, the at least one stained fabric item is chemically pretreated once the at least one RFID tag is removed; and
 j) deactivating the RFID transponder through the on/off button wherein, the RFID transponder is deactivated into standby mode.

2. The method of claim 1 further comprising the steps of:
 a) creating the at least one tagged stained fabric item by placing the at least one magnet to one side of the at least one stained fabric item at the at least one stain; and
 b) juxtaposing the at least one RFID tag housing to the other side of the at least one stained fabric item at the at least one stain wherein, the at least one RFID tag housing and the at least one magnet remain in position at the at least one stain through magnetic attraction.

3. A system for marking, tracking, and locating stains on a fabric item for application of a stain treatment prior to laundering comprising:
 a) at least one RFID tag attaching to at least one stained fabric item wherein, the at least one RFID tag marks at least one stain on the at least one stained fabric item thereby creating at least one tagged stained fabric item;
 b) a RFID transponder that cooperates with the at least one RFID tag to cause the at least one RFID tag to be activated and emit at least one emission wherein, the at least one tagged stained fabric Item can be located through the at least one emission;
 c) the at least one tagged stained fabric item being created by the at least one RFID tag housing having at least one side that is a ferrous metallic surface wherein, the ferrous metallic surface cooperates with a magnet to attach the at least one RFID tag to the at least one stained fabric item;
 d) the RFID transponder having an on/off button wherein the RFID transponder can be activated from standby mode to power mode through the on/off button;
 e) the RFID transponder activating the at least one RFID tag wherein, the at least one RFID tag emits a visual or audio signal once activated further wherein, the at least one tagged stained fabric Item can be located through the visual or audio signal;
 f) the magnetic attraction between the at least one RFID tag and the magnet being releasable wherein, the at least one RFID tag can be removed from the at least one stained fabric item so that the at least one stain can be chemically pretreated once the at least one RFID tag is removed; and
 g) the on/off button deactivating the RFID transponder wherein, the RFID transponder is deactivated from power mode into standby mode when not in use.

4. The system of claim 3 further comprising:
 a) the at least one tagged stained fabric item being created by the at least one magnet being placed to one side of the at least one stained fabric Item at the at least one stain; and
 b) the at least one RFID tag housing being Juxtaposed on the other side of the at least one stained fabric item at the at least one stain wherein, the at least one RFID tag housing and the at least one magnet remain in position at the at least one stain through magnetic attraction.

* * * * *